United States Patent [19]

Illes, Jr.

[11] 4,130,225
[45] Dec. 19, 1978

[54] APPARATUS FOR FACILITATING THE REPAIR OF A VOLUMETRIC FEEDER

[75] Inventor: Charles P. Illes, Jr., Chattanooga, Tenn.

[73] Assignee: Flowstar Industries, Inc., Passaic, N.J.

[21] Appl. No.: 748,334

[22] Filed: Dec. 7, 1976

Related U.S. Application Data

[63] Continuation-in-part of Ser. No. 663,321, Mar. 3, 1976, Pat. No. 4,020,980.

[51] Int. Cl.² ............................................. G01F 11/20
[52] U.S. Cl. .................................... 222/411; 222/502; 214/17 D; 29/401 R
[58] Field of Search ............ 222/410, 411, 370, 179.5, 222/173, 182, 153, 502, 459; 214/17 D; 220/229, 213; 285/363, 368; 29/401 R

[56] References Cited

U.S. PATENT DOCUMENTS

| 1,751,335 | 3/1930 | Kennedy | 222/411 |
| 2,547,321 | 4/1951 | Henderson | 285/363 |
| 4,020,980 | 5/1977 | Illes | 222/411 |
| 4,026,427 | 5/1977 | Greaves et al. | 214/36 |

FOREIGN PATENT DOCUMENTS 663122  8/1930  France ..................................... 222/370

Primary Examiner—Robert B. Reeves
Assistant Examiner—H. Grant Skaggs
Attorney, Agent, or Firm—Seidel, Gonda & Goldhammer

[57] ABSTRACT

A gravity assisted feeder is disclosed for feeding flowable solids by means of a rotating blade disposed below a stationary cone. Rotation of the blade causes the solids to move inwardly along the blade to a discharge port adjacent the axis of rotation of the blade. An annular disc is removably supported between the stationary cone and a housing of the feeder. Communication into the feeder is thereby blocked to allow the feeder to be repaired.

15 Claims, 4 Drawing Figures

APPARATUS FOR FACILITATING THE REPAIR OF A VOLUMETRIC FEEDER

CROSS-REFERENCE TO RELATED APPLICATION

This application is a continuation-in-part of my pending application Ser. No. 663,321, filed on Mar. 3, 1976, which issued as U.S. Pat. No. 4,020,980 on May 3, 1977.

BACKGROUND

It is believed that the feeder of this application is classified in class 222/411. For relevant prior art, see U.S. Pat. Nos. 1,914,162; 1.751,335; 3,804,303; and 3,036,745. For other art of interest wherein the blade does not rotate about a fixed axis, see U.S. Pat. No. 3,809,286. It is believed that none of the feeders in said patents are truly volumetric feeders wherein a predictable amount of solids are uniformly fed per unit time. It is also believed that the vessels disposed above the feeders in said patents must be emptied prior to performing any repairs on the feeders.

The apparatus of the present invention for feeding flowable solids includes a housing adapted to be attached to a storage vessel. The housing includes a discharge port adjacent a lower end thereof. A cone is supported by the housing with the lower periphery of the cone above the elevation of said port. An annular disc is removably supported by the cone and the upper end of the housing in order to block communication into the housing.

The housing supports at least one feeder blade for feeding solids from within the housing to said port. A means is provided to support the blade for rotation in one direction about the axis of said discharge port with the blade at an elevation below the elevation of said periphery of said cone. The blade has an outer end on which is attached the curved tip portion. The curved tip portion preferably extends outwardly beyond the periphery of the cone and is curved in the direction of rotation to feed solids inwardly to the discharge port.

The blade has an upright fin secured thereto and extending from a location adjacent the tip portion to a location adjacent the discharge port. The height of the fin is greater than the thickness of the tip portion. The outermost end of the fin is coextensive with the innermost end of the tip portion to form a substantially continuous surface for moving solids inwardly to the discharge port as the blade rotates.

An annular disc is provided for sealing communication between the storage vessel and the housing whenever repairs are to be performed on the feeder. The annular disc is divided, in the preferred embodiment, into four quadrants or sections and is supported along its inner edge by the cone and along its outer circumference by the upper end of the vertical wall of the housing. With the four sections of the annular disc in place, communication between the storage vessel and the housing is completely blocked. The seal enables the entire blade structure to be removed from the housing for repair.

In addition to providing positive volumetric feeding, the apparatus of the present invention has a high feed capacity and improves the feeding of low density hard-flowing solids such as bran, rice hulls, cut plastic film, as well as aerated solids that have a tendency to flow like a liquid. The apparatus of the present invention also provides a simplified method of gaining access to the interior of the feeder in order to facilitate repairs thereto.

It is an object of the present invention to provide a novel apparatus for feeding flowable solids.

It is another object of the present invention to provide a means for blocking communication between a supply vessel and the housing of a feeder.

It is another object of the present invention to provide a method of repairing a volumetric feeder without the necessity of emptying a supply vessel prior to performing the repairs.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown in FIG. 1 a feeder in accordance with the present invention designated generally as 10.

Figures 3, 4:
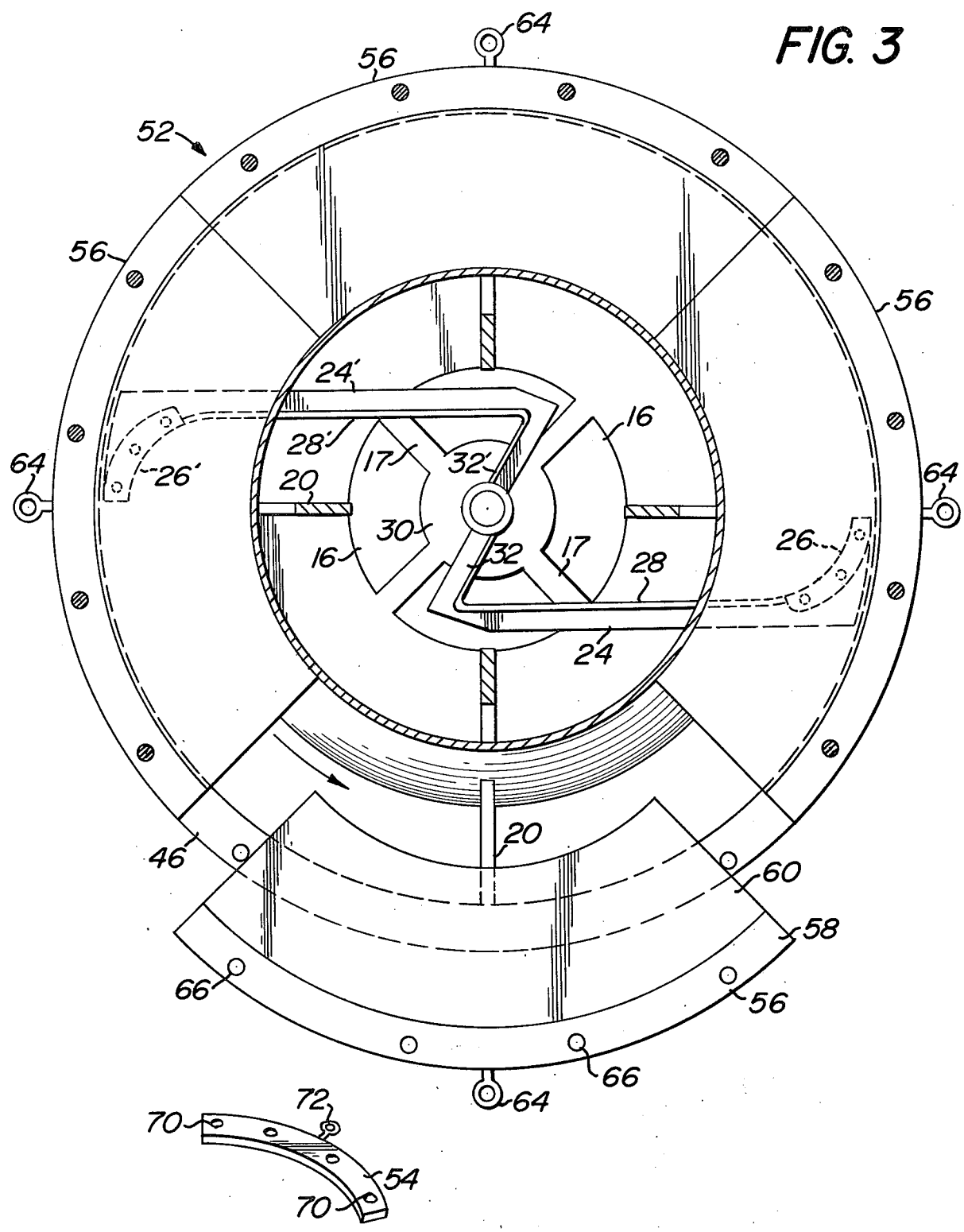
FIG. 3 is a sectional view taken along the line 3—3 in FIG. 2 illustrating one section of the annular disc in a displaced position.
FIG. 4 is a perspective view of one section of an annular ring which is used in place of the annular disc during the normal operation of the feeder.

The feeder 10 includes an upright generally cylindrical housing 12 having a flat base plate 14 at its lower end. The base plate 14 is provided with a discharge port 16 which may be in the form of a plurality of segments 16 as shown in FIG. 3. The segments are defined by webs 17.

An inverted cone 18 is supported by the housing 12 in any suitable manner such as by struts 20. The cone 18 preferably has a downwardly extending peripheral rim which acts as a flow guide in conjunction with the inner periphery of the housing 12 as will be made clear hereinafter. A blade 24 is provided for feeding flowable solids from a location immediately outwardly from the rim 22 of the cone 18 and inwardly to the discharge port 16.

The blade 24 may be a single blade or as shown more clearly in FIG. 3, a double blade wherein one portion is designated 24 and the mating oppositely disposed portion is designated 24'. Only blade 24 will be described in detail with corresponding elements having corresponding primed numerals on the blade 24'.

The blade 24 is a flat blade which slides over base plate 14 and is preferably made from any one of the wide variety of suitably hardened metals. A tip portion 26 is secured to the upper surface of the blade 24 adjacent the outer end thereof immediately adjacent to the outer periphery of flat base plate 14. The tip portion 26 is preferably removably secured to the blade 24 by threaded fasteners so that any one of a variety of different tip portions having different thicknesses may be substituted for one another to thereby vary the "bite" into the flowable solids. Blade 24 is rotated about the axis of the discharge protion 16 in a single direction as indicated by the arrow in FIG. 3 and tip portion 26 is curved in that direction.

Figure 1:
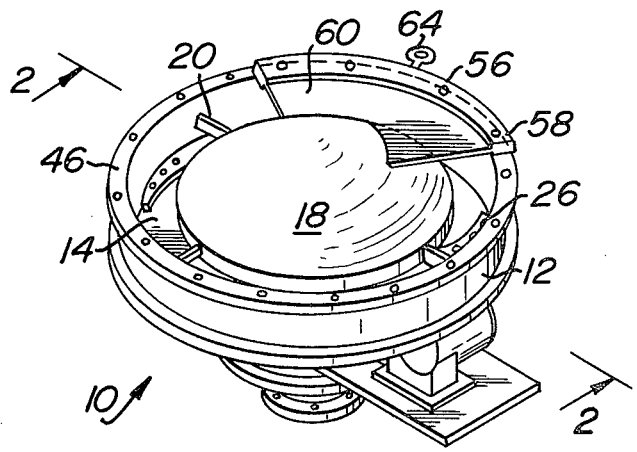
FIG. 1 is a perspective view of a feeder in accordance with the present invention.
Figure 2:
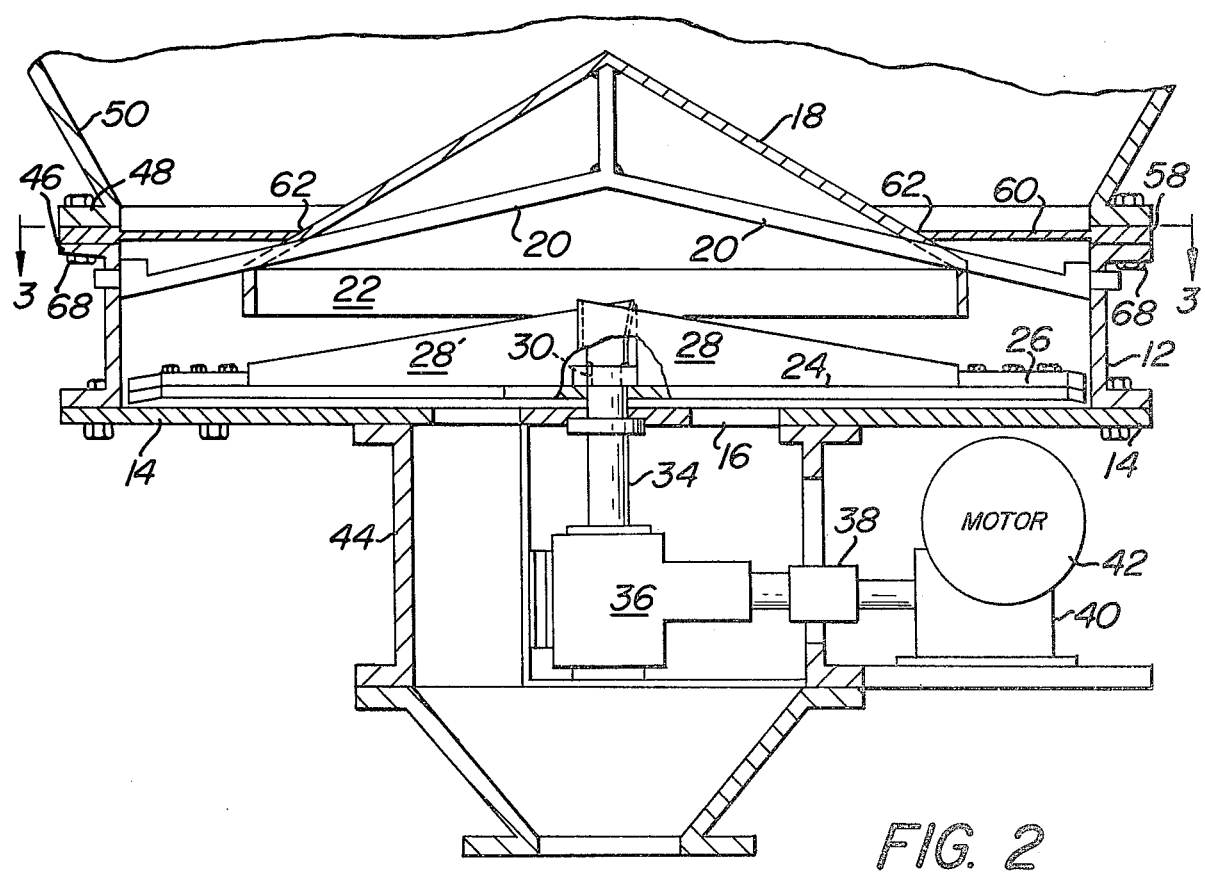
FIG. 2 is a sectional view taken along the line 2—2 in FIG. 1 but on an enlarged scale.

An upstanding fin 28 is provided on the leading edge of the blade 24. The fin 28 extends from the tip portion 26 to the hub 30. Fin 28 includes a radially outwardly disposed portion 32 extending from the hub with the height of the fin 28 being greatest at or adjacent the discharge protion 16. See FIG. 2 wherein the upper surface of the blade 28 tapers downwardly to the tip portion 26. The fin 28 forms a continuation of the feeding surface on the tip portion 26.

A shaft 34 is provided concentric with the discharge port 16 and extends upwardly through a hole in a portion of the web 17 and through the hub 30. A retainer or fastener may be secured to the upper end of shaft 34. Shaft 34 drives the blades 24, 24' so that they rotate in one direction such as counterclockwise in FIG. 3.

The lower end of shaft 34 is coupled to a right angle gear box 36. A shaft extends horizontally out of the gear box 36, through a coupling 38, to the gear reducer 40 which is driven by motor 42. The motor 42, gear reducer 40, and gear box 36 are supported by suitable brackets on the discharge chute 44. Chute 44 is coaxial with the discharge port 16 and is removably secured to the base plate 14.

The upper end of the housing 12 is provided with a radially outwardly directed flange 46. As will be more fully explained hereinafter, feeder 10 includes an annular disc 52 which seals the lower end of vessel 50 whenever it is necessary to perform repairs on the feeder. The outer circumference of the annular disc 52 rests upon the flange 46. During the normal operation of the feeder, an annular segmented ring replaces the annular disc 52 and rests upon the flange 46. One quadrant or section 54 of the annular ring is illustrated in FIG. 4. Vessel 50 is a storage vessel such as a silo or the like. Flowable solids disposed within vessel 50 are fed by the apparatus 10 at a predictable rate per unit time. The flowable solids descend downwardly into the annular space between the outer periphery of rib 22 and the inner periphery of the housing 12. If necessary or desired, cone 18 may be vibrated to facilitate flow.

The tip portion 26 preferably extends beyond the periphery of the rib 22 and "bites" into the flowable solids which are at their angle of repose. Tip portion 26 and blade 24 need only extend out to the periphery of flat base plate 14. The solids move inwardly along the periphery of tip portion 26 and inwardly along the fin 28 to the discharge port 16. Solids which flow downwardly by gravity through the discharge port 16 discharge from the chute 44 onto a conveyor, into a container, or the like.

The cone 18 establishes an angle of repose with the base plate 14 to thereby prevent flushing of solids through the discharge port 16. The height of the cone 18 from the base plate 14 serves as a flow governor. That is, the greater the height, the greater the amount of material that may be drawn in by the feeder blade 24, 24'. The cone 18 also serves as a distributor in that it forces the flowable solids in vessel 50 to the outer perimeter of the base plate 14 thereby limiting the area from which the solids may be fed. Such distribution of the solids also enhances flow and prevents flushing of the solids through the discharge port 16.

The fin 28 insures positive feed of the material to the discharge port 16. The height of the fin 28 serves as a flow limit stop thereby prohibiting flowable solids from moving onto the upper surface of the blade 24 from either side of the blade 24 which would contribute to non-uniform flow. The single direction of rotation of the blade 24 produces a constant, non-pulsing feed rate. As a result thereof, the feed rate is predictable at various rotation speeds of the blade 24.

It will be noted that substantially all of the blade 24 lies beneath the cone 18 with only the tip portion 26 extending beyond the periphery of the cone 18. This reduces the amount of vertical forces exerted by the flowable material in the vessel 50 which must be counteracted by the force for rotating blade 24. As a result thereof, the horsepower and torque requirements for rotating the blade 24 are reduced to an economical level. Wear on the feeder blade 24 and the base plate 14 may be minimized by providing hardened surfaces on those elements. Motor 42 is an electric motor. However, air motors or hydraulic motors may be utilized if desired. The discharge angle of chute 44 may be varied as desired. It will be noted that the cone 18 is supported by the housing 12 independently from the blade 24 which is supported by the base plate 14 and shaft 34.

Whenever it is necessary to either repair or replace the drive mechanism of the feeder 10, the blades 24, 24' or the tips 26, 26', the annular disc 52 is interposed between the housing 12 and the vessel 50. In the preferred embodiment, the annular disc 52 is divided into four quadrants or sections 56. Each section 56 is divided into two portions 58, 60. When section 56 is installed, portion 58 lies along the outer circumference of the section and will be supported by the flange 46 of the housing 12. The portion 60 lies inwardly of the portion 58 and is disposed entirely within the housing 12 when the section 56 is completely inserted into position. Each portion 60 has a beveled surface 62 at its arcuate inner end. The beveled surface 62 mates with the angled outer surface of cone 18. The portions 60 have a cross-sectional thickness less than that of the portions 58. To facilitate the insertion and removal of the sections 56, each section 56 is provided with a handle. As shown, the handle can be an outwardly extending projection such as hook 64. Each of the sections 56 has a plurality of holes, such as four holes 66 drilled therethrough. The holes 66 align with holes extending through the flange 46 of housing 12 and the holes extending through flange 48 of the vessel 50. Any conventional fastening means, such as nuts and bolts 68 can be passed through the holes to thereby secure the sections 56 in place.

When the feeder 10 is not being repaired but is either idle or in its normal operating mode, the annular disc 52 is replaced by an annular ring comprised of a plurality of discrete sections 54. The sections 54 are similar to the sections 56 but do not have portions 60 extending into the interior of the housing 12. The sections 54 thus form an annular spacing ring which completely overlies the flange 46 and is juxtaposed to the flange 48 of the vessel 50. Each section 54 has holes 70 therethrough and a hook 72 extending outwardly therefrom. The holes 70 and the hook 72 perform the same functions as the holes 66 and hook 64 of the sections 56.

Once the feeder has been operative and it becomes necessary to repair the feeder, the following operation is followed. The bolts 68 are removed from the holes 70 of one section 54 and the one section 54 is slid out from between flanges 46, 48 by pulling its hook 72. Thereafter, a disc section 56 may be slid into the space between flanges 46, 48 and into the interior of the housing 12. The thickness of the portion 58 is approximately the same as the thickness of the section 54 but greater than the thickness of portion 60. The portion 60 can therefore be easily slipped between the flanges 46 and 48 and thereafter forced through any material between the housing and the vessel until the beveled surface 62 rests upon the cone 18. The bolts 68 can thereafter be replaced to thereby secure section 56 56 into position. This procedure is repeated with the remaining sections 54 and 56 until all of the ring sections 54 are removed and all of the disc sections 56 are in place. The housing 12 is thus completely sealed from the vessel 50. Thereafter, the bolts 74 securing the plate 14 to the housing 12 can be removed and the base plate 14, the blades 24, 24' and the drive mechanism can be removed. In this manner, repairs can be performed to the feeder 10 without the necessity of emptying the vessel 50.

The sections 56 may be used whenever it is desired to seal the vessel 50 to prevent the contents of the vessel 50 from being exposed to the environment by way of feeder 10. Thus, occasions may arise when for sanitary purposes or for some other purpose it is desired to seal vessel 50. The sections 56 of disc 52 can be used for that purpose. While I prefer to make disc 52 into four sections 56, disc 52 may be made into two, three or some other number of sections.

The present invention may be embodied in other specific forms without departing from the spirit or essential attributes thereof and, accordingly, reference should be made to the appended claims, rather than to the foregoing specification as indicating the scope of the invention.

I claim:

1. Feeder apparatus comprising:
   (a) a housing, a base plate having means defining a discharge port in said plate, said plate being adjacent the lower end of a vertical wall of said housing,
   (b) a cone supported by said housing, said cone having its lower periphery within said housing above the elevation of said port and radially inward of said housing wall,
   (c) at least one feeder blade supported within said housing for feeding solids from within said housing to said port,
   (d) an annular disc removably supported along its outer circumference by the upper end of said vertical wall and along its inner circumference by said cone, said annular disc being divided into at least two sections, whereby said annular disc cooperates with said cone to seal the upper end of said housing, means securing said outer circumference of each disc to said housing, said securing means being readily removable whereby each of said disc sections can be independently secured to and removed from said housing.

2. Apparatus in accordance with claim 1 wherein said base plate and said feeder blade is removably supported by said housing.

3. Apparatus in accordance with claim 1 including a flange extending outwardly from the upper end of said vertical wall, said annular disc being divided into at least four sections, each disc section being supported along its outer circumference by said flange.

4. Apparatus in accordance with claim 3 including a handle means on each said disc section, each handle means extending outwardly from the periphery of each of said disc sections.

5. Apparatus in accordance with claim 3 wherein the inner end of each disc section has a beveled surface for mating contact with the adjacent outer surface of said cone and being thinner than the outer peripheral portion of each disc section.

6. Apparatus in accordance with claim 3 wherein a vessel is supported above said annular disc and is attached thereto by said securing means.

7. Apparatus in accordance with claim 1 including a spacer ring divided into sections, each ring section being adapted to be substituted for a disc section when said blade is being used to feed solids to said port.

8. Apparatus in accordance with claim 7 including a handle means on each said ring sections, each said handle means extending outwardly from the periphery of each said ring sections.

9. Apparatus for feeding flowable solids comprising:
   (a) a housing, a base plate having means defining a discharge port in said plate, said plate being adjacent the lower end of a vertical wall of said housing,
   (b) a cone supported by said housing, said cone having its lower periphery within said housing above the elevation of said port and radially inward of said housing wall,
   (c) at least one horizontally disposed feeder blade generally parallel to said base plate for feeding solids from within said housing to said port, said blade overlying said plate and being supported for rotation in one direction about the axis of said port at an elevation below the elevation of said periphery of said cone, said blade having an outer end adjacent said housing wall, a tip portion removably attached to the upper surface of said blade radially outwardly of the lower periphery of said cone, said tip portion being curved at its leading edge in the direction of rotation to feed solids inwardly towards said port,
   (d) an upright fin secured to said blade adjacent its leading edge and extending from a location adjacent said tip portion to a location adjacent said port, the height of said fin being greater than the thickness of said tip portion, the height of said fin adjacent said port being greater than the height of said fin adjacent said tip portion, the outer end of said fin being coextensive with the inner end of said tip portion to form a substantially continuous surface for moving solids inwardly to said port as said blade rotates,
   (e) an annular disc removably supported along its outer circumference by the upper end of said vertical wall and along its inner circumference by said cone, said annular disc being divided into at least two sections, whereby said annular disc and said cone seal the upper end of said housing, means securing said outer circumference of each disc to said housing, said securing means being readily removable whereby each of said disc sections can be independently secured to and removed from said housing.

10. Apparatus in accordance with claim 9 wherein said base plate and said at least one feeder blade is removably supported by said housing.

11. Apparatus in accordance with claim 9 including a flange extending outwardly from the upper end of said vertical wall, said annular disc being divided into at least four sections, each disc section being supported along its outer circumference by said flange.

12. Apparatus in accordance with claim 11 wherein the inner end of each disc section has a beveled surface for mating contact with the adjacent outer surface of said cone and being thinner than the outer peripheral portion of each disc section.

13. Apparatus in accordance with claim 11 wherein a vessel is supported above said annular disc and is attached thereto by said securing means.

14. Apparatus in accordance with claim 9 including a spacer ring divided into sections, each ring section being adapted to be substituted for a disc section when said blade is being used to feed solids to said port.

15. Apparatus in accordance with claim 14 including a discrete handle on each said ring section and each said disc section and extending outwardly from the periphery of each of said ring and disc sections.

* * * * *